United States Patent [19]

Strack et al.

[11] 4,305,916

[45] * Dec. 15, 1981

[54] CRYSTALLINE ZEOLITE POWDER OF TYPE A (III)

[75] Inventors: Hans Strack, Alzenau; Wolfgang Roebke, Wesseling; Dieter Kneitel; Ehrfried Parr, both of Rodenbach, all of Fed. Rep. of Germany

[73] Assignee: Degussa & Henkel Kommanditgesellschaft Auf Aktien, Frankfurt, Fed. Rep. of Germany

[ * ] Notice: The portion of the term of this patent subsequent to Dec. 1, 1998, has been disclaimed.

[21] Appl. No.: 846,017

[22] Filed: Oct. 27, 1977

[30] Foreign Application Priority Data

Nov. 11, 1976 [DE] Fed. Rep. of Germany ....... 2651436

[51] Int. Cl.$^3$ ............................................. C01B 33/28
[52] U.S. Cl. ..................................... 423/329; 423/328
[58] Field of Search ............................... 423/328–330; 252/89 R, 131, 135, 455 Z

[56] References Cited

U.S. PATENT DOCUMENTS

| | | | |
|---|---|---|---|
| 2,882,243 | 4/1959 | Milton | 423/328 |
| 3,058,805 | 10/1962 | Weber | 423/329 |
| 3,985,669 | 10/1976 | Krummel et al. | 252/89 R X |
| 4,041,135 | 9/1977 | Williams et al. | 423/329 |
| 4,073,867 | 2/1978 | Roebke et al. | 423/329 |

FOREIGN PATENT DOCUMENTS 2412837  10/1974  Fed. Rep. of Germany ...... 423/328

*Primary Examiner*—Edward J. Meros
*Attorney, Agent, or Firm*—Cushman, Darby & Cushman

[57] ABSTRACT

There are produced crystalline zeolite powders of Type A with the composition $$1.0\pm0.2 M_{2/n}O:Al_2O_3:1.85\pm0.5 SiO_2.yH_2O$$

where M is a metal cation, n is it valence and y has a value up to 6 with 50 weight % of the particles not over $4.3\mu$ and with a particle spectrum:

| Fraction ($\mu$) | Portion (weight %) |
|---|---|
| <3 | 18 to 38 |
| <5 | 70 to 82 |
| <10 | 93 to 99 |
| <15 | 96 to 100 | by hydrothermally crystallizing a $SiO_2$, $Al_2O_3$, $Na_2O$ and water containing alkali aluminate, water, silicate synthesis mixture with an optional tempering step wherein in a given case during the crystallization or tempering step instead of stirring shearing forces are employed. The process comprises providing an aqueous alkali aluminate liquor having a temperature of 30° to 100° C. and containing 0.1 to 100 grams of $Al_2O_3/l$ and 1 to 200 grams of $Na_2O/l$, feeding in an alkali silicate solution within 10 to 200 minutes to obtain a clear reaction solution having the composition $SiO_2/Al_2O_3=50$ to 1000:1, $Na_2O/SiO_2=0.2$ to 20:1 and $H_2O/Na_2O=4$ to 300:1, adding with stirring to the synthesis mixture an aqueous sodium aluminate which contains 10 to 200 grams/l of $Al_2O_3$ and 10 to 250 grams/l of $Na_2O$ having a temperature of 30° to 100° C. and allowing the thus obtained synthesis mixture to crystallize at a temperature within between 20° and 175° C. in at least 15 minutes.

8 Claims, No Drawings

CRYSTALLINE ZEOLITE POWDER OF TYPE A (III)

BACKGROUND OF THE INVENTION

The invention is directed to a crystalline zeolite powder of Type A having the composition $$1.0 \pm 0.2 M_{2/n}O : Al_2O_3 : 1.85 \pm 0.5 SiO_2 . yH_2O$$

wherein M is a metal cation, e.g., sodium, potassium, lithium, calcium, magnesium or barium, n its valence and y has a value up to 6 with 50 weight % of the particles not over $4.3\mu$ and a process for the production of the crystalline zeolite powder by means of a hydrothermal crystallization of an alkali aluminate silicate mixture, as well as its use in washing, rinsing and cleansing agents.

Zeolite molecular sieves and their special properties for ion exchange and adsorption have been known for a long time. Their synthesis depends on heating an aqueous synthesis mixture with the components a $Na_2O \times b\ Al_2O_3 \times c\ SiO_2$ to a temperature between 50° and 300° C. According to the composition of the starting mixture, reaction temperature and reaction time there are obtained different structured compounds of the general formula $$Na_xAl_xSi_yO_{2(x+y)} . nH_2O$$

which are distinguishable by their X-ray spectra. Sodium can be replaced by other mono- and divalent metal cations, e.g., potassium, lithium, cesium, magnesium, barium and strontium.

For use as adsorption agents, catalyst carriers or ion exchangers the molecular sieves are converted into molded articles with a suitable binder. The production of the molded article means a great industrial expense with simultaneous reduction of the effect because of the binder component. Also, because of the long diffusion path, the reaction speed is greatly retarded, which, e.g., makes cumbersome the drying of organic liquids. It is, therefore, significant to add molecular sieve powders in many uses.

The known processes of production (e.g., Milton German Pat. No. 1,038,017 and Milton U.S. Pat. No. 2,882,243) have in common that crystals are obtained in the molecular sieve synthesis whose average diameter is above about $2\mu$, whereby a considerable portion, customarily between 3 and 12 weight % have a border grain (limiting particle) diameter above $45\mu$. This portion is designated grit; it is ascertained by DIN 53580 (German Industrial Standard 53580) by wet sieving according to Mocker. In a typical product for this process, it has been ascertained that about 25 weight % of the particles have a diameter below $10\mu$, 50 weight % have a particle diameter below $13\mu$ (D. W. Breck, *Zeolite Molecular Sieves*, page 388 (1974)).

The invention is based on the problem of creating a process of synthesizing and providing a powdery zeolitic molecular sieve of Type A having a samller particle size without formation of grit components (particles $>45\mu$), which molecular sieve is especially useful as an ion exchange, e.g., for water softening. The absence of grit as well as a smaller particle size is indispensable for a number of uses within the invention, e.g., use of such molecular sieves, e.g., as phosphate replacements in washing, rinsing and cleansing, processes. Washing, rinsing and cleansing processes, especially in machines, imply indeed a lasting suspension of the molecular sieve (as a result of a slight tendency for quiescent setting) in the liquor in order to make possible a residue free rinsing after completion of the process.

SUMMARY OF THE INVENTION

The purpose of the invention is to produce a crystalline zeolite powder of Type A with the composition $$1.0 \pm 0.2 M_{2/n}O : Al_2O_3 : 1.85 \pm 0.5 SiO_2 . yH_2O$$

where M is a metal cation, e.g., a Group Ia metal (alkali metal) such as sodium, potassium, lithium or cesium or a Group IIa metal (alkaline earth metal) such as magnesium, calcium, strontium or barium, n is its valence and y has a value up to 6 with 50 weight % of the particles having a maximum particle size of $4.3\mu$ and with a particle spectrum:

| Fraction ($\mu$) | Portion (weight %) |
|---|---|
| <3 | 18 to 38 |
| <5 | 70 to 82 |
| <10 | 93 to 99 |
| <15 | 96 to 100 |

A further object of the invention is the development of a process for the production of the crystalline zeolite powder of the invention by hydrothermally crystallizing a $SiO_2$, $Al_2O_3$, $Na_2O$ and water containing alkali aluminate, water, silicate synthesis mixture with an optional tempering step wherein in a given case during the crystallization or tempering step instead of stirring shearing forces are employed. The process comprises providing an aqueous alkali aluminate liquor having a temperature of 30° to 100° C. and containing 0.1 to 100 grams of $Al_2O_3/l$ and 1 to 200 grams of $Na_2O/l$, feeding in an alkali silicate solution within 10 to 200 minutes to obtain a clear reaction solution having the composition $SiO_2/Al_2O_3 = 50$ to $1000:1$, $Na_2O/SiO_2 = 0.2$ to $20:1$ and $H_2O/Na_2O = 4$ to $300:1$, adding with stirring to the synthesis mixture an aqueous sodium aluminate which contains 10 to 200 grams/l of $Al_2O_3$ and 10 to 250 grams/l of $Na_2O$ having a temperature of 30° to 100° C. and allowing the thus obtained synthesis mixture to crystallize at a temperature within between 20° and 175° C. in at least 15 minutes.

The alkali silicate solution has 50 to 150 grams of $Na_2O/l$ and 200 to 450 grams of $SiO_2/l$.

Shearing can be accomplished, for example, with an energy introduction of 0.4 to 2 $KW/m^3$.

In a preferred form of the invention the aqueous sodium aluminate having a content of 10 to 200 grams of $Al_2O_3/l$ and 10 and 250 grams of $Na_2O/l$ can be added stepwise to the reaction mixture, e.g., in two steps, wherein the speed of addition in the second step is 2 to 10 times higher than in the first step.

Instead of stirrers there can be used in the process of the invention shearing forces, for which purpose known apparatuses can be employed. These known procedures increase the particle fineness, but are not necessary for carrying out the process of the invention.

The synthesis mixture arising by the addition of a higher concentrated alkali aluminate liquor can contain the individual components in the molar ratios which are used in the known processes. Such known processes are described in Milton German Pat. No. 1,038,017, Milton U.S. Pat. No. 2,882,243 and Weber German Auslegeschrift No. 1,095,795. Thus, the Weber Auslegeschrift shows molar ratios of $Na_2O:Al_2O_3$ of from 2 to 4:1.

In the process of the invention during the crystallization and during the in a given case subsequent tempering step shearing forces can act on the synthesis mixture.

Under the term "shear" as is used in the present case, are all mechanical stresses causing comminution of discrete particles found in the suspension, which rest predominantly on true shearing action. The shearing can be carried out discontinuously or continuously.

As the shearing apparatus there is preferred a turbine stirrer, for example, the EKATO turbine stirrer. However, there can also be used crown gear dissolvers, dispersing pumps, centrifugal pumps and other apparatus for the shearing.

While the crystallization in the present case, for example, can be carried out at 93° C., it has proven advantageous to carry out the tempering in the crystallization mother liquor at a temperature between 85° and 105° C., whereby the time of tempering is advantageously between 0.2 to 6, most favorably 0.8 to 4.0, particularly three hours.

While crystallization is preferably carried out at 93° C., this temperature can be varied, e.g., between 90° and 100° C.

The tempering time begins at the point at which the crystallization is finished. This is recognizable by the development of maximum ion exchange power, the reaching of maximum X-ray line intensity and the production of about 22.5% water vapor absorption. In practice, a foundation is laid based on empirical values determined by optimization of a recipe.

A shearing influence up to the end of the crystallization phase can be so intensified that the average particle diameter can be reduced to a very low value. Thereby the value for the limiting particle and its percentage in the product likewise is reduced. However, shearing carried out during the tempering step has exclusive influence on the limiting particle and its portion of all of the particles.

Finally, the invention concerns the use of the zeolitic molecular sieves of Type A, obtainable by the process of the invention, as ion exchangers, e.g., for water softening, particularly as phosphate substitutes in washing, rinsing and cleansing agents.

Such washing agents are combinations of surface active washing materials, but for the most part also contain other, predominantly inorganic additives which contribute to the washing result or are necessary for the process of production and the outer product quality. Depending on the intended use, the composition of the washing agent is varied. It depends on the type of fiber, dyeing and washing temperature, as well as apart therefrom whether the washing is by hand, e.g., in a kettle, in a home washing machine, or in a laundry. Most washing agents are pourable powders. However, there are also liquid and pasty products (see Ullmann's Enzyklopadie der technischen Chemie, 3rd edition, Vol. 18, Urban & Schwarzenberg, Munich, 1967).

The crystalline zeolite powder of Type A produced by the invention has the advantage that it is already produced in grit-free form and contains smaller particles. Therefore, when it is used as a phosphate substitute in washing and cleansing agents, it can be easily held in suspension in the liquor employed, as well as particularly easily rinsed from washing and cleansing machines and their loads.

The use of the alkali aluminum silicates of the invention has the advantage that the loading of the environment with phosphate will no longer occur. Eutrophication of the waters, seas and rivers will no longer result to the presently known extent if the molecular sieves of the invention are employed in the washing agent.

Except for replacing of the phosphate by the molecular sieve, the washing agents are the same as those conventionally employed in the art. Thus, there can be used the conventional surfactants or detergents, e.g., anionic, cationic and nonionic detergents. Thus, as detergents there can be used, for example, higher alkyl sulfate detergents, particularly the alkali metal salts of such sulfates, those having 8 to 22 carbon atoms in the alkyl residue such as sodium laruyl sulfate, potassium lauryl sulfate, sodium octadecyl sulfate, sodium coconut fatty alcohol sulfate, sodium octanyl sulfate, sodium alkyl $(C_{14}-C_{18})$ sulfate, as well as the corresponding long chain aliphatic sulfonates, e.g., sodium octanyl sulfonate, sodium dodecyl sulfonate, sodium tetradecyl sulfonate, sodium octadecyl sulfonate, potassium dodecyl sulfonate, ammonium dodecyl sulfonate, sodium decyl sulfonate, higher alkyl ether sulfates, higher alkyl glyceryl ether sulfonates, higher alkyl phenol polyethylene oxide sulfates, polyoxyethyl ethers of fatty alcohols, polyethylene oxide condensates with higher alkyl phenols such as isooctyl and nonyl phenol condensed with 3 to 20 moles of ethylene oxide, sodium o-xylene sulfonate, potassium xylene sulfonate, potassium tertiary octylbenzene sulfonate, potassium dodecyl toluene sulfonate, sodium p-xylene sulfonate, sodium propyl naphthalene sulfonate, sodium butylnaphthalene sulfonate, lauramidodipropyl dimethyl benzyl ammonium chloride and N-diethylamino oleylamide hydrochloride.

There can also be present conventional additives including bleaching agents, e.g., sodium perborate, water softeners, e.g., borax, as well as other additives including sodium carbonate, sodium sulfate and potassium carbonate, as well as polyvinyl alcohol, carboxymethyl cellulose, etc.

The other materials can be omitted if desired.

The compositions can comprise, consist essentially of, or consist of the materials set forth.

POC is a poly(hydroxycarboxylate) prepared by the Cannizzaro reaction of a poly(aldehydocarboxylate), see Haschke U.S. Pat. No. 3,923,742.

Unless otherwise indicated all parts and percentages are by weight.

The process of the invention is further explained in connection with the following examples.

DESCRIPTION OF THE PREFERRED EMBODIMENTS

EXAMPLE 1

There were present in a 2 $m^3$ tank at 70° C. 550 liters of an aqueous sodium aluminate liquor which contained 78 grams/l of $Na_2O$ and 5 grams/l of $Al_2O_3$.

There were fed in within 40 minutes under stirring with a three stage Mig stirrer to the liquor 300 liters of waterglass (d=1.35 kg/l) containing 7.4% $Na_2O$ and 25.7% $SiO_2$. The solution was clear.

To the solution there were first added in 15 minutes 100 liters of an aqueous sodium aluminate liquor having a temperature of 70° C. and then there were added in 60 minutes a further 900 liters of the same sodium aluminate liquor at 70° C. The sodium aluminate liquor contained 160 grams/l of Na$_2$O and 106 grams/l of Al$_2$O$_3$. The reaction mixture was warmed to 85° C. and crystallized for three hours. The crystalline product was X-ray graphically pure zeolite A having the following particle spectrum:

| Fraction ($\mu$) | Portion (weight %) |
| --- | --- |
| <3 | 21 |
| <5 | 76 |
| <10 | 97 |
| <15 | 98 | in which the 50 weight % portion was below 3.8$\mu$.

The particle size determination was carried out by Coulter Counter measurement.

EXAMPLE 2

Perborate Containing Washing Agent

Sodium aluminum silicate according to Example 1: 45.0 weight % (dried for 6 hours at 90° C., water content 16.8 weight %).

Sodium perborate: 20.0 weight %.

Washing agent powder: 35.0 weight %.

The washing agent powder was produced, for example, by hot drying the following compositions:

| | |
| --- | --- |
| ABS (sodium dodecylbenzene sulfonate) | 21.0% |
| Ethoxylated tallow alcohol (1 mole tallow alcohol + 14 moles ethylene oxide) | 7.5% |
| Soap (sodium salt of saturated essentially C$_{18}$-C$_{22}$ fatty acids) | 7.2% |
| Waterglass (Na$_2$O 3.3SiO$_2$) | 9.0% |
| Magnesium sulfate | 4.5% |
| Carboxymethyl cellulose | 2.0% |
| Optical brightener | 0.6% |
| Soluble complex (e.g., sodium citrate, or nitrilotriacetic acid (NTA), or ethylene diamine tetraacetic acid (EDTA), or sodium triphosphate, or POC, etc.) | 9.0% |
| Sodium sulfate | 35.0% |
| Water | Balance |

The washing agent was produced by mixing the three constituents in powder form.

EXAMPLE 3

Perborate Free Washing Agent

Ethoxylated C$_{11}$-C$_{15}$ oxoalcohol (1 mole oxoalcohol + 3 moles ethylene oxide): 2.0 weight %*.

*This ingredient can be replaced by the same amount of tallow alcohol +5 moles of the ethylene oxide.

Ethoxylated C$_{11}$-C$_{15}$ oxoalcohol (1 mole oxoalcohol + 13 moles ethylene oxide): 5.0 weight %**.

**This ingredient can be replaced by the same amount of tallow alcohol +14 moles of ethylene oxide.

Sodium aluminum silicate prepared according to Example 1 (dried for 6 hours at 90° C., water content 16.8 weight %): 40.0 weight %.

Soda (sodium carbonate): 15.0 weight %.

Sodium citrate: 5.0 weight %.

Waterglass (Na$_2$O 3.3SiO$_2$): 4.0 weight %.

Carboxymethyl cellulose: 1.5 weight %.

Optical brightener: 0.2 weight %.

Sodium sulfate: 23.0 weight %.

Water: Balance

The washing agent was produced by spraying the ethoxylation product (nonionic surfactant) on the powder particles consisting of the remaining constituents.

What is claimed is:

1. A process of preparing a crystalline zeolite powder of Type A with the composition $$1.0\pm0.2M_{2/n}O:Al_2O_3:1.85\pm0.5SiO_2.yH_2O$$

where M is a sodium cation, n is its valence and y has a value up to 6 with 50 weight % of the particles not over 4.3$\mu$ and with a particle spectrum:

| Fraction ($\mu$) | Portion (weight %) |
| --- | --- |
| <3 | 18 to 38 |
| <5 | 70 to 82 |
| <10 | 93 to 99 |
| <15 | 96 to 100 | comprising hydrothermally crystallizing a SiO$_2$, Al$_2$O$_3$, M$_2$O and water containing alkali aluminate, water, alkali silicate synthesis mixture where M is sodium, said process including the steps of providing an aqueous alkali aluminate liquor having a temperature of 30° to 100° C. and containing 0.1 to 100 grams of Al$_2$O$_3$/l and 1 to 200 grams of Na$_2$O/l, feeding in sodium silicate solution containing 50 to 150 grams of Na$_2$O/l and 200 to 450 grams of SiO$_2$/l within 10 to 200 minutes to obtain a clear reaction solution having the composition SiO$_2$/Al$_2$O$_3$=50 to 1000:1, Na$_2$O/SiO$_2$=0.2 to 20:1 and H$_2$O/Na$_2$O=4 to 300:1, adding with stirring to the synthesis mixture an aqueous sodium aluminate containing 10 to 200 grams/l of Al$_2$O$_3$ and 10 to 250 grams/l of Na$_2$O having a temperature of 30° to 100° C., the aqueous sodium aluminate having 10 to 200 grams/l of Al$_2$O$_3$ and 10 to 250 grams/l of Na$_2$O being added to the synthesis mixture in two steps, the speed of addition in the second step being 2 to 10 time higher than in the first step, and allowing the thus obtained synthesis mixture to crystallize at a temperature between 20° and 170° C. for at least 15 minutes.

2. A process according to claim 1 including a tempering step after the crystallization.

3. A process according to claim 1 wherein 10% of the aqueous sodium aluminate is added in the first step and 90% is added in the second step, the rate of addition in the second step being 2.25 times that in the first step.

4. A process according to claim 1 wherein a tempering step at 85° to 105° C. for 0.2 to 6 hours is carried out after the crystallization.

5. A process according to claim 4 wherein the crystallization is carried out at 90° to 100° C.

6. A process according to claim 1 wherein the crystallization is carried out at 90° to 100° C.

7. A process according to claim 1 wherein there are initially present at 70° C. in the tank 500 liters of aqueous sodium aluminate containing 78 grams/l of Na$_2$O and 5 grams/l of Al$_2$O$_3$, there is fed in 300 liters of waterglass containing 7.4% Na$_2$O and 25.7% SiO$_2$ and the aqueous sodium aluminate is added to the synthesis mixture in two steps with 100 liters having a temperature of 70° C. being added in 15 minutes and then a further 900 liters of the same aqueous sodium aluminate solution having a temperature of 70° C. being added in 60 minutes, added aqueous sodium aluminate containing 160 grams/l of Na$_2$O and 100 grams/l of Al$_2$O$_3$.

8. A process according to claim 1 consisting essentially of the steps set forth.

* * * * *